United States Patent [19]

Shiraishi et al.

[11] Patent Number: 5,121,322
[45] Date of Patent: Jun. 9, 1992

[54] STEERING HANDLE NEUTRAL POSITION ESTIMATING APPARATUS

[75] Inventors: Yasuhiro Shiraishi, Atsugi; Yasuki Ishikawa, Sagamihara, both of Japan

[73] Assignee: Nissan Motor Co., Ltd., Yokohama, Japan

[21] Appl. No.: 518,729

[22] Filed: May 3, 1990

[30] Foreign Application Priority Data

May 15, 1989 [JP] Japan .................................. 1-120885

[51] Int. Cl.⁵ ............................................ B62D 5/06
[52] U.S. Cl. ............................. 364/424.05; 180/79.1; 180/140; 180/142
[58] Field of Search ...................... 364/424.03, 424.04, 364/424.05; 180/79.1, 140–143; 307/10.1, 10.7; 340/438, 456, 465

[56] References Cited

U.S. PATENT DOCUMENTS

| | | | |
|---|---|---|---|
| 4,602,695 | 7/1986 | Takeshima et al. | 364/424.05 |
| 4,666,011 | 5/1987 | Ohe et al. | 364/424.05 |
| 4,730,686 | 3/1988 | Shimizu | 364/424.05 |
| 4,939,654 | 7/1990 | Kouda et al. | 364/424.05 |

FOREIGN PATENT DOCUMENTS

| | | |
|---|---|---|
| 3811100A1 | 10/1988 | Fed. Rep. of Germany . |
| 3819837A1 | 5/1989 | Fed. Rep. of Germany . |
| 4012880A1 | 10/1990 | Fed. Rep. of Germany . |
| 59-26341 | 2/1984 | Japan . |
| 62-85043 | 10/1988 | Japan . |

*Primary Examiner*—Gary Chin
*Attorney, Agent, or Firm*—Foley & Lardner

[57] ABSTRACT

A steering handle neutral position estimating apparatus for use with a motor vehicle having a steering handle operable to provide a driver's vehicle steering demand. The apparatus comprises a first sensor sensitive to steering handle position for producing an electric signal indicative of a sensed steering wheel position, and a second sensor sensitive to steering handle position for producing a steering handle neutral position signal having a first level when the sensed steering handle position is in a predetermined range and a second level when the sensed steering handle position is out of the predetermined range. The first and second sensors are coupled to an estimating unit which produces an estimation command signal when conditions determined for parameters that are sensed when the vehicle is operating are fulfilled. In the presence of the estimation command signal, a steering handle neutral position value is estimated when the steering handle neutral position signal is at its first level. The estimation unit detects an error introduced into the estimated steering handle neutral position value to produce an error signal. The conditions are rendeted more severe each time the conditions are fulfilled in the absence of the error signal. The conditions are initialized in the presence of the error signal.

1 Claim, 8 Drawing Sheets

STEERING HANDLE NEUTRAL POSITION ESTIMATING APPARATUS

BACKGROUND OF THE INVENTION

This invention relates to an apparatus for estimating a neutral position for the steering handle of a motor vehicle. Although the invention will be described in connection with a rear wheel steering control system, it should be understood that the invention is equally applicable to other vehicle dynamic characteristic control systems including active suspension control systems and the like utilizing information on steering wheel position to control the vehicle dynamic characteristics including yaw velocity, side velocity, roll velocity, etc.

For example, Japanese Patent Kokai No. 59-26341 discloses a steering handle neutral position estimating apparatus which employs a steering handle position sensor for sensing the existing steering handle position. The existing steering handle position is set for a steering handle neutral position when two conditions are fulfilled; that is, when the existing steering handle position is within a predetermined range, and when vehicle has traveled from the rest at a distance greater than a reference value. The steering handle neutral position estimating apparatus can estimate the steering handle neutral position with high accuracy by increasing the reference value with increasing traveling distance. Since the estimated steering handle neutral position is held until the two conditions are fulfilled again, however, it takes a long time to cancel an erroneous steering handle neutral position which may be set because of a failure in the steering handle position sensor or a high speed operation of the steering handle. This is true particularly with steering handle neutral position estimating apparatus of the type having such conditions which becomes more severe as the traveling distance increases.

SUMMARY OF THE INVENTION

Therefore, it is a main object of the invention to provide an improved steering handle neutral position estimating apparatus which can cancel an erroneous steering handle neutral position value in a short time.

There is provided, in accordance with the invention, a steering handle neutral position estimating apparatus for use with a motor vehicle having a steering handle operable to provide a driver's vehicle steering demand. The apparatus comprises first sensor means sensitive to steering handle position for producing an electric signal indicative of a sensed steering wheel position, and second sensor means sensitive to steering handle position for producing a steering handle neutral position signal having a first level when the sensed steering handle position is in a predetermined range and a second level when the sensed steering handle position is out of the predetermined range. The first and second sensor means are connected to an estimating unit which includes first means for producing an estimation command signal when conditions determined for parameters that are sensed when the vehicle is operating are fulfilled, second means responsive to the estimation command signal for estimating a steering handle neutral position value when the steering handle neutral position signal is at its first level, third means for detecting an error introduced into the estimated steering handle neutral position value to produce an error signal, and fourth means for rendering the conditions more severe each time the conditions are fulfilled in the absence of the error signal, and fifth means responsive to the error signal for initializing the conditions.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
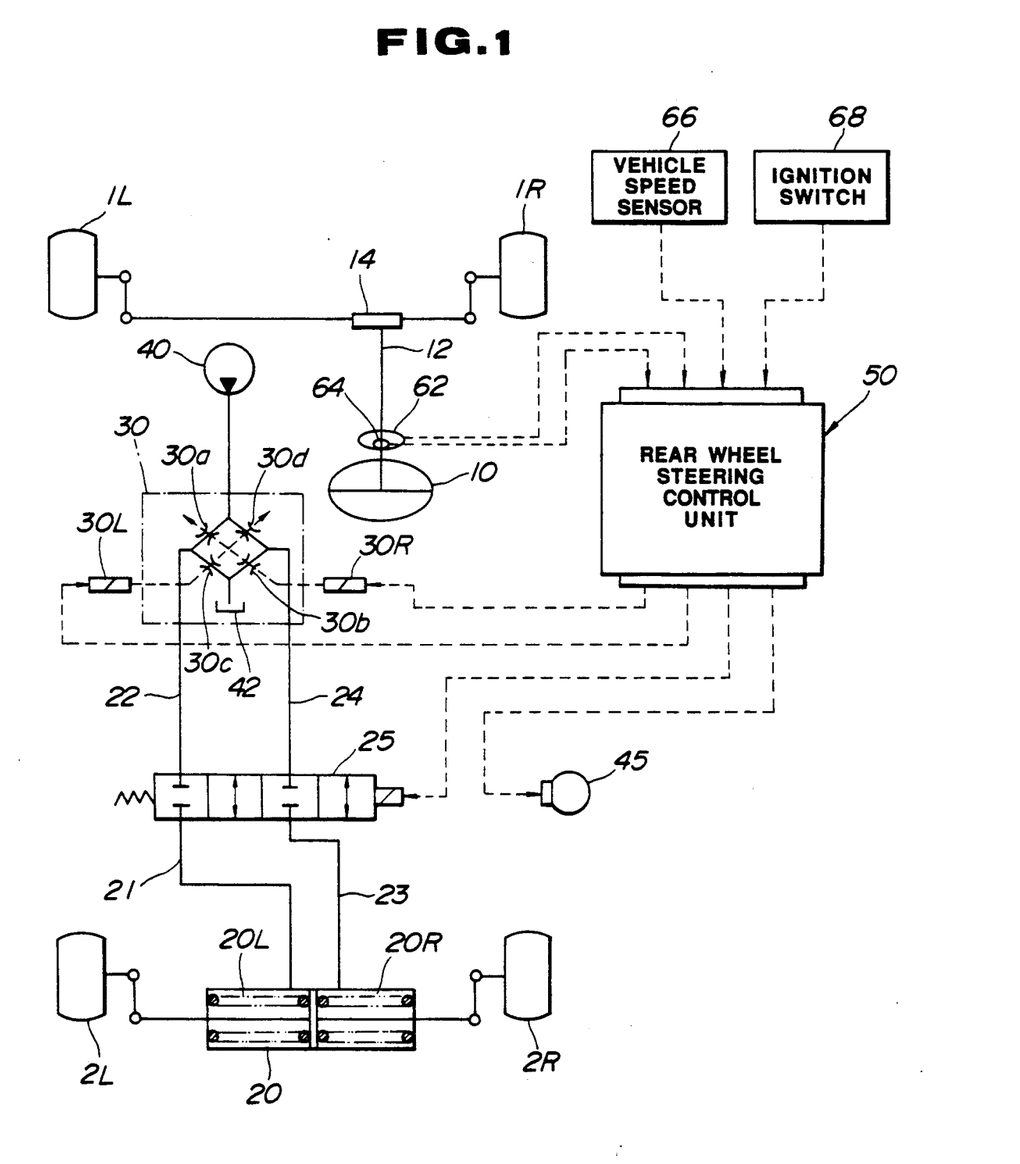
FIG. 1 is a schematic diagram of a vehicle dynamic characteristic control apparatus embodying the invention.

With reference to the drawings, and in particular to FIG. 1, there is shown a schematic diagram of a steering control system embodying the invention. The steering control system will be described in connection with a four wheel steering type automotive vehicle supported on a pair of steerable front wheels 1L and 1R spaced laterally apart at equal distances from a vehicle longitudinal axis and a pair of steerable rear wheels 2L and 2R spaced laterally apart at equal distances from the vehicle longitudinal axis.

The front wheels 1L and 1R are connected to a steering wheel or handle 10 through a conventional link mechanism including a steering shaft 12 and a steering gear 14. The rear wheels 2L and 2R are associated with a hydraulic actuator 20 of the spring center type having two pressure chambers 20L and 20R for turning the rear wheels 2L and 2R in response to the hydraulic pressure acting in the first or second pressure chamber 20L or 20R. The steering actuator 20 turns the rear wheels 2L and 2R in a counter-clockwise direction at an angle proportional to the hydraulic pressure introduced into the first pressure chamber 20L with respect to the vehicle longitudinal axis and it turns the rear wheels 2L and 2R in the clockwise direction at an angle proportional to the pressure introduced into the second pressure chamber 20R with respect to the vehicle longitudinal axis. The first pressure chamber 20L is connected through a conduit 21 to a cutoff solenoid valve 25 and hence through a conduit 22 to a control valve 30. The second pressure chamber 20R is connected through a conduit 23 to the cutoff solenoid valve 25 and hence through a conduit 24 to the control valve 30.

The cutoff valve 25 is normally in a closed position cutting off communication between the lines 21 and 22 and at the same time cutting off communication between the conduits 23 and 24. The cutoff valve 25 moves to its open position establishing communication between the conduits 21 and 22 and at the same time establishing communication between the lines 23 and 24 in the presence of a drive signal IF in the form of electric current applied thereto from a control unit 50. The control unit 50 interrupts the application of the drive signal IF when the ignition switch (not shown) is turned off or when a trouble occurs in the steering control system.

The control valve 30 has two pairs of variable area orifices connected in a bridge configuration. One pair of orifices 30a and 30b are associated with a solenoid 30R which varies the opening areas of the orifices 30a and 30b as a function of the magnitude of a drive signal IR* in the form of electric current applied thereto from the control unit 50. The orifices 30a and 30b have a maximum opening area in the absence of the drive signal IR*. The other pair of orifices 30c and 30d are associated with a solenoid 30L which varies the opening areas of the orifices 30c and 30d as a function of the magnitude of a drive signal IL* in the form of electric current applied thereto from the control unit 50. The orifices 30c and 30d have a maximum opening area in the absence of the drive signal IL*. The bridge is driven by a hydraulic source which is obtained from an electric pump 40 having its outlet connected to the bridge for supplying hydraulic fluid to the bridge. Excess hydraulic fluid is discharged from the bridge to a reservoir 42.

In the absence of the drive signals IL* and IR*, the orifices 30a, 30b, 30c and 30d are open fully to discharge all of the hydraulic pressure from the electric pump 40 to the reservoir 42. As a result, no hydraulic pressure is supplied to the first and second pressure chambers 20L and 20R. The control valve 30 supplies a hydraulic pressure corresponding to the magnitude of the drive signal IL* or IR* through the cutoff valve 25 to the first or second pressure chamber 20L or 20R of the hydraulic actuator 20.

The steering angle of the rear wheels 2L and 2R, this being determined by the magnitude of the drive signal. IL* or IR* applied to the first or second solenoids 30L or 30R, is repetitively determined from calculations performed by the control unit 50, these calculations being based upon various conditions of the automotive vehicle that are sensed during its operation. These sensed conditions include steering wheel position, steering wheel rotating direction, steering wheel neutral position, and vehicle speed. Thus, a steering wheel position sensor 62, a steering wheel neutral position sensor 64 and a vehicle speed sensor 66 are connected to the control unit 50. The numeral 68 designates an ignition switch connected to the control unit 50. When the ignition switch 68 is turned on, energy is supplied to the ignition system and to the control unit 50.

Figure 2:
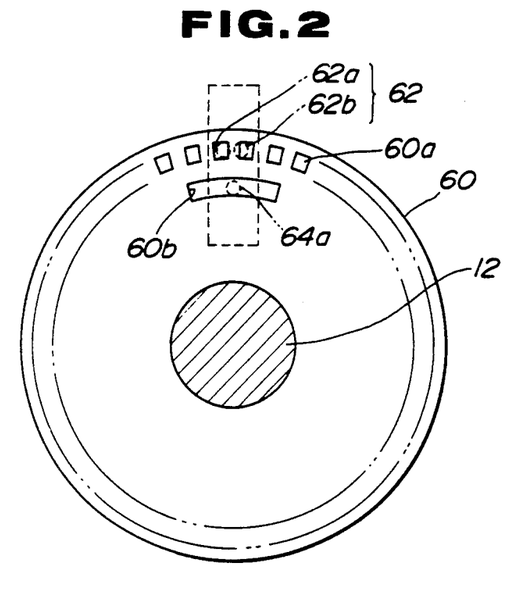
FIG. 2 is a plan view used in explaining the steering wheel position sensor and steering wheel neutral position sensor used in the control apparatus.

Referring to FIG. 2, the numeral 60 designates a sensor disc mounted for rotation in unison with the steering shaft 12 secured at its one end to the steering wheel 10. The sensor disc 60 is formed therein with a number of openings 60a and a slit 60b. The openings 60a, which are equally spaced circumferentially at several degrees of rotation of the sensor disc 60, are formed over the entire 360° of rotation of the sensor disc 60. The slit 60b extends circumferentially through a predetermined number of degrees of rotation of the sensor disc 60 to determine a steering wheel neutral position range.

Figure 3:
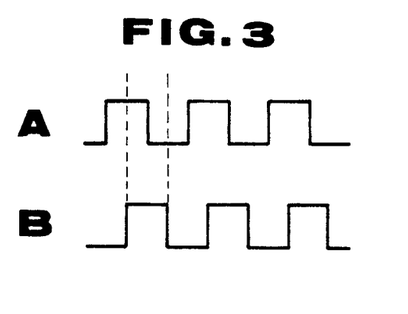
FIG. 3 is a voltage waveform timing diagram illustrating a difference between the phases of the steering wheel position signals produced from the steering wheel position sensor when the steering wheel rotates in a first direction.
Figure 4:
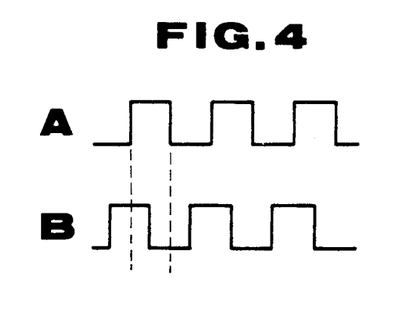
FIG. 4 is a voltage waveform timing diagram illustrating a difference between the phases of the steering wheel position signals produced from the steering wheel position sensor when the steering wheel rotates in a second, opposite direction.

The steering wheel position sensor 62 comprises two light emission diodes 62a and 62b and two light sensor elements (not shown) facing to the respective light emission diodes 62a and 62b. The light emission diodes 62a and 62b are located on one side of the sensor disc 60 and the corresponding light sensor elements are located on the opposite side of the sensor disc 60. The light emission diode 62a emits light to the corresponding light sensor element which produces a steering wheel position signal having a high level upon the receipt of the light emitted from the light emission diode 62a through one of the openings 60a and a low level when the sensor disc 60 interrupts the path of the light emitted from the light emission diode 62a, as shown by the waveforms A of FIGS. 3 and 4. The number of pulses of this steering wheel position signal corresponds to the steering wheel position in the form of the degrees of rotation of the steering wheel 10 from a reference position. Similarly, the light emission diode 62b emits light to the corresponding light sensor element which produces a steering wheel position signal having a high level upon the receipt of the light emitted from the light emission diode 62b through one of the openings 60a and a low level when the sensor disc 60 interrupts the path of the light emitted from the light emission diode 62b, as shown by the waveforms B of FIGS. 3 and 4. The number of pulses of this steering wheel position signal corresponds to the steering wheel position in the form of the degrees of rotation of the steering wheel 10 from a reference position. The light emission diodes 62a and 62b are spaced apart from each other at a distance equal to one-half of the pitch of the openings 60a so that a phase shift occurs between the steering wheel position signals in one direction (FIG. 3) upon rotation of the steering wheel 10 in a clockwise direction and in the opposite direction (FIG. 4) upon rotation of the steering wheel 10 in the counter-clockwise direction. Thus, the steering wheel position signals indicate the direction and degree of rotation of the steering wheel 10.

Figure 5:
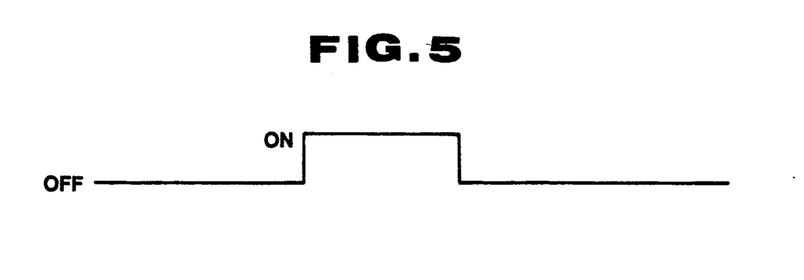
FIG. 5 is a voltage waveform timing diagram illustrating the steering wheel neutral position signal produced from the steering wheel neutral position sensor.

The steering wheel neutral position sensor 64 includes a light emission diode 64a and a light sensor element (not shown) facing to the light emission diode 64a. The light emission diode 64a is located on one side of the sensor disc 60 and the corresponding light sensor element is located on the other side of the sensor disc 60. The light emission diode 64a emits light to the corresponding light sensor element which produces a steering wheel neutral position signal having a high level upon the receipt of the light emitted from the light emission diode 64a through the slit 60b and a low level when the sensor disc 60 interrupts the path of the light emitted from the light emission diode 64a, as shown in FIG. 5. The angle (steering wheel straight ahead driving range) through which the slit 60b extends circumferentially is determined to ensure that the steering wheel neutral position signal is at its high level during straight ahead driving. Considering the assembling errors (±5°) and the driver's correction (±5°) of steering wheel position, this angle may be set at 20°.

Figure 6:
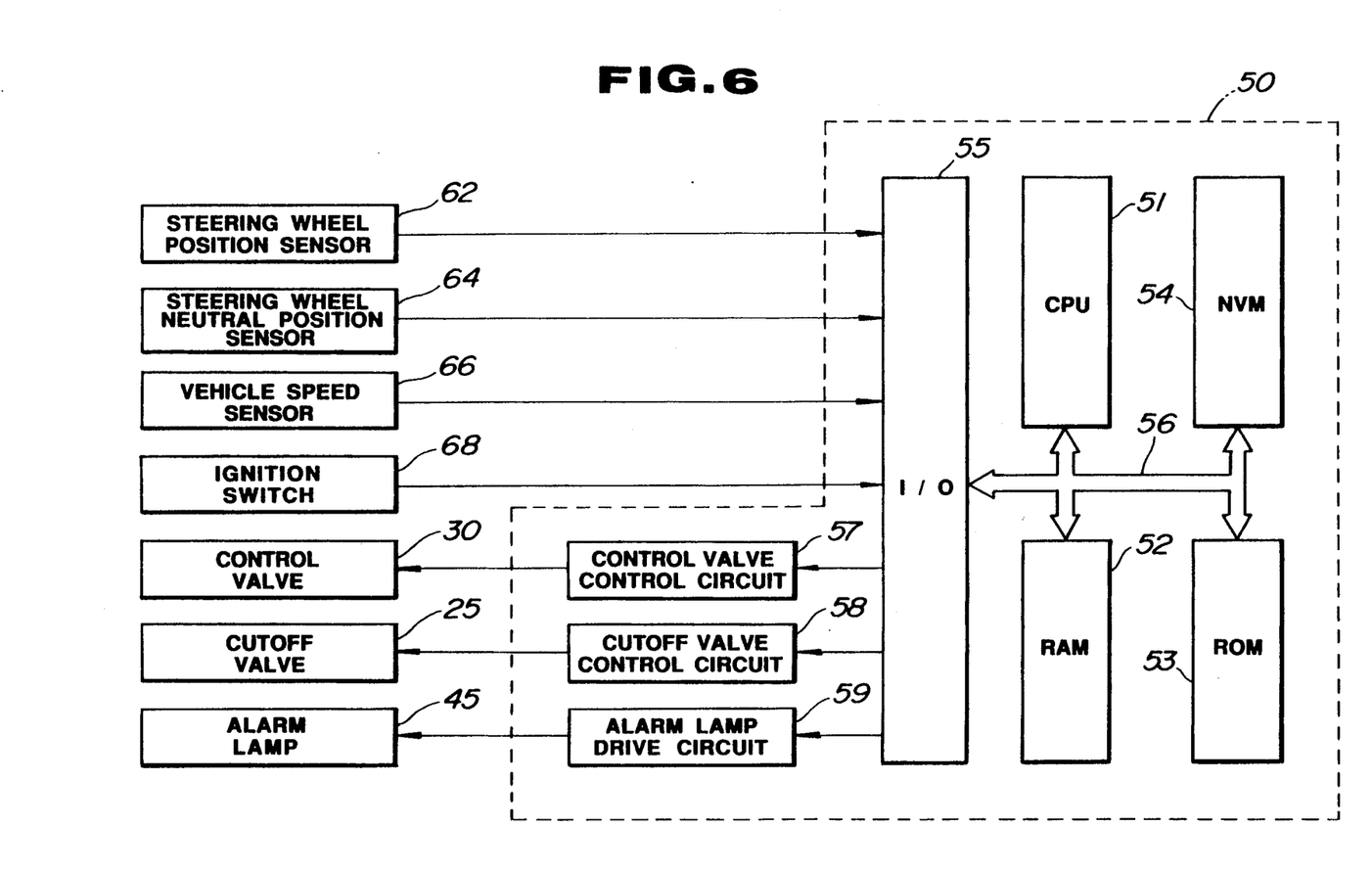
FIG. 6 is a block diagram illustrating the detailed arrangement of the control unit.

Referring to FIG. 6, the control unit 50 employs a digital computer including a central processing unit (CPU) 51, a random access memory (RAM) 52, a read only memory (ROM) 53, a nonvolatile memory (NVM) 54, and an input/output control circuit (I/O) 55. The central processing unit 51 communicates with the rest of the computer via data bus 56. The input/output control circuit 55 includes an analog-to-digital converter and counters. The input/output control unit 55 is connected to the steering wheel position sensor 62, the steering wheel neutral position sensor 64, the vehicle speed sensor 66 and the ignition switch 68 for converting the sensor signals for application to the central processing unit 51. The read only memory 53 contains the programs for operating the central processing unit 51 and further contains appropriate data in look-up tables used in calculating appropriate values for rear wheel steering angle. The look-up table data may be obtained experimentally or derived empirically. Control words specifying a desired rear wheel steering angle are periodically transferred by the central processing unit 51 through the input/output control circuit 55 to a control valve control circuit 57 which converts it into a drive signal IL* or IR* to the control valve 30. When a failure occurs in the steering control system, the central processing unit 51 produces a command which is fed through the input/output control circuit 55 to a cutoff valve control circuit 58 which thereby interrupts the drive signal IF to close the cutoff valve 25 and also another command which is fed through the input/output control circuit 55 to an alarm lamp drive circuit 59 which thereby activates an alarm lamp 45 to provide a visual indication that a failure occurs in the steering control system.

Figure 7:
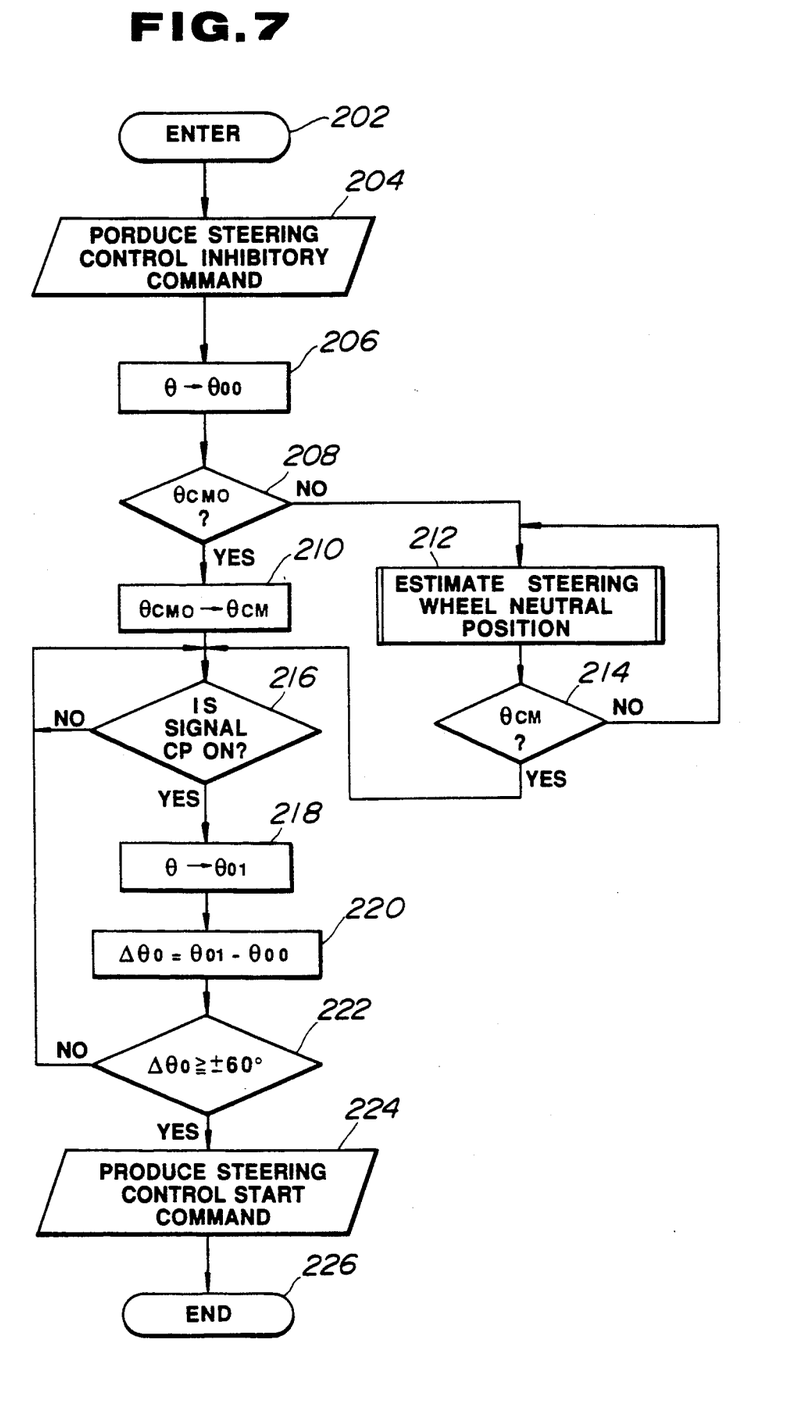
FIG. 7 is an overall flow diagram showing the programming of the digital computer used in the control unit.

FIG. 7 is an overall flow diagram illustrating the programming of the digital computer. The computer program is entered at the point 202 when the ignition switch 68 is turned on. At the point 204 in the program, an inhibitory signal is produced to inhibit the rear wheel steering control of the control unit 50. At the point 206, the central processing unit 51 reads a value $\theta$oo for steering wheel position $\theta$ and stores the read value $\theta$oo in the random access memory 52. This value $\theta$oo indicates the steering wheel position $\theta$ when the ignition switch 68 is turned on.

At the point 208 in the program, a determination is made as to whether or not the nonvolatile memory 54 has the last steering wheel neutral position value $\theta$CMO which was normally estimated and stored in the nonvolatile memory 54 during the last cycle of execution of this program. If the answer to this question is "yes", then the program proceeds to the point 210 where the last steering wheel neutral position value $\theta$CMO is set for steering wheel neutral position $\theta$CM and then to the point 216. Otherwise, the program proceeds to the point 212 where the central processing unit 51 estimates a steering wheel neutral position value $\theta$CM. This estimation will be described further in connection with FIG. 11. After the estimated steering wheel neutral position value $\theta$CM is stored in the nonvolatile memory 54, the program proceeds to a determination step at the point 214. This determination is as to whether or not the estimated steering wheel neutral position value $\theta$CM has been stored in the nonvolatile memory 54. If the answer to this question is "yes", then the program proceeds to the point 216. Otherwise, the program returns to the point 212.

At the point 216 in the program, a determination is made as to whether or not the steering wheel neutral position signal CP, which is fed from the steering wheel neutral position sensor 64, is at its high level. If the answer to this question is "yes", then it means that the steering wheel is in the predetermined neutral position range and the program proceeds to the point 218 where the central processing unit 51 reads a value $\theta$o1 for steering wheel position $\theta$. This value $\theta$o1 indicates the steering wheel position $\theta$ when the steering wheel neutral position signal CP changes to the high level. At the point 220 in the program, the central processing unit 51 calculates an difference $\Delta\theta$ of the steering wheel rotation position value $\theta$oo from the steering wheel position value $\theta$o1 as $\Delta\theta = \theta$o1 $- \theta$oo. Thus, the calculated difference $\Delta\theta$ indicates the degrees of rotation of the steering wheel 10 in the interval between the time at which the ignition switch 68 is turned on and the time at which the steering wheel 10 moves out of the neutral position range.

At the point 222 in the program, a determination is made as to whether or not the calculated difference $\Delta\theta$ is in a predetermined range defined between a lower limit (for example, $-60°$) and an upper limit (for example, $60°$). If the answer to this question is "yes", then the program proceeds to the point 224. Otherwise, the program returns to the point 216. At the point 224, the central processing unit 51 produces a control start command causing the control unit 50 to start the rear wheel steering control. Following this, the program proceeds to the end point 226.

Normally, the control unit 50 can start the rear wheel steering control in a few seconds after the ignition switch is turned on to supply energy to the control unit 50 whenever the steering wheel neutral position signal CP changes to its high level before the steering wheel 10 is rotated at an angle greater than a predetermined value (in this case 60°) in the clockwise or counterclockwise direction. This angle of rotation of the steering wheel 10 is normally less than the predetermined value since the power steering unit is deactivated when the ignition switch 68 is turned off. Consequently, the normal steering wheel neutral position can be estimated to be the steering wheel position which is read when the steering wheel neutral position signal CP changes to its high level before the steering wheel rotates at an angle greater than the predetermined value. This estimation is effective to distinguish the normal steering wheel neutral position from an incorrect steering wheel neutral position at 360 degrees of rotation of the steering wheel 10. For this purpose, the control unit 50 may be arranged to start the rear wheel steering control when the steering wheel neutral position signal CP changes to its high level before the steering wheel 10 is rotated at an angle equal to or greater than 180° in the clockwise or counter-clockwise direction.

Figure 8:
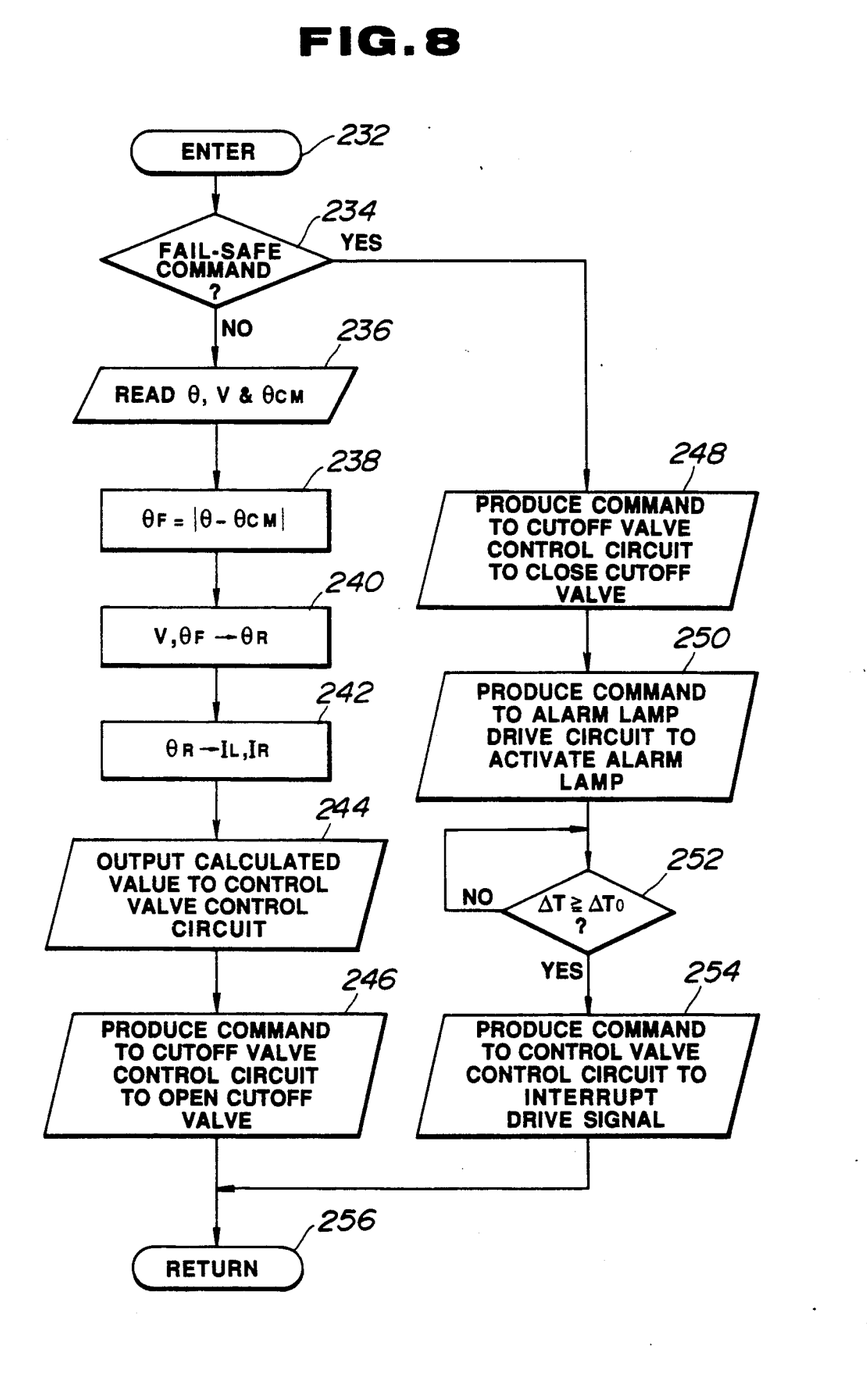
FIG. 8 is a flow diagram showing the programming of the digital computer as it is used for rear wheel steering control.

FIG. 8 is a flow diagram illustrating the programming of the digital computer as it is used for the rear wheel steering control along with the fail-safe control. The computer program is entered at the point 232 when the control start command is produced at the point 224 of FIG. 7. At the point 234 in the program, a determination is made as to whether or not a fail-safe signal occurs. The fail safe signal is produced when a failure occurs in the steering control system. If the answer to this question is "no", then the program proceeds to the point 236 where the central processing unit 51 reads the steering wheel position $\theta$, the vehicle speed V, and the estimated steering wheel neutral position $\theta$CM. At the point 238 in the program, the central processing unit 51 calculates a front wheel steering angle $\theta$F by subtracting the estimated steering wheel neutral position $\theta$CM from the steering wheel position $\theta$. In this case, the front wheel steering angle $\theta$F is represented as $\theta F = |\theta - \theta CM|$.

Figure 9A:
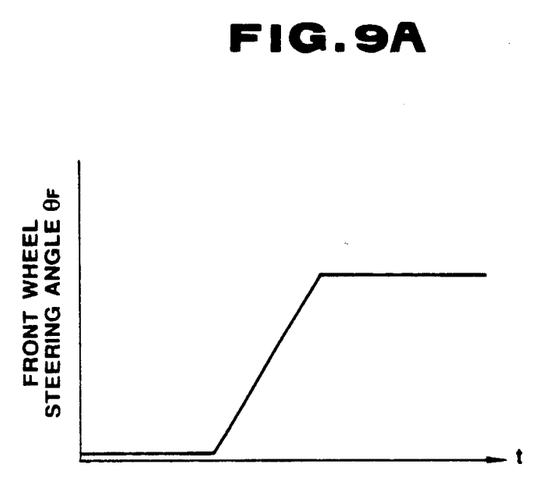
FIG. 9 is a diagram showing front wheel steering angle variations and corresponding rear wheel steering angle variations.
Figure 9B:
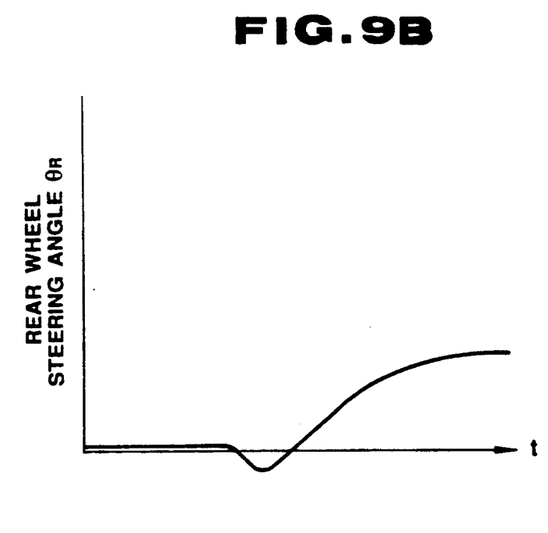

At the point 240 in the program, the central processing unit 51 calculates a required value $\theta$R for rear wheel steering angle based on the read vehicle speed V and the calculated front wheel steering angle $\theta$F. Preferably, the required rear wheel steering angle value $\theta$R is calculated in a manner to provide a first order advance phase inversion control where the rear wheels 2L and 2R are turned for a moment in the direction opposite to the direction in which the front wheel 1L and 1R are turned and then are turned in the same direction as the front wheel steering direction, as shown in FIG. 9. When the rear wheels 2L and 2R are turned in the direction opposite to the front wheel steering direction, a cornering force is applied in the yaw direction so as to decrease the time required for the yaw rate to increase to a sufficient value. After a sufficient yaw rate is obtained, the rear wheels 2L and 3R are turned in the same direction as the front wheel steering direction so as to limit the yaw rate increase and thus decrease the sideslip angle. This is effective to increase the steering operation stability and decrease the steering operation response time. This is true particularly at low and intermediate vehicle speeds.

At the point 242 in the program, the central processing unit 51 calculates a value IL or IR for the magnitude of the drive signal IL* or IR* supplied to the solenoid 30L or 30R based on the required rear wheel steering angle $\theta$R from a relationship programmed into the digital computer. This relationship defines drive signal magnitude as a function of required rear wheel steering angle.

At the point 244 in the program, the calculated drive signal magnitude value IL or IR is transferred to the control valve control circuit 57. The control valve control circuit 57 then sets the control valve 30 by producing a drive signal IL* or IR* to the corresponding solenoid 30L or 30R to cause the hydraulic actuator 20 to turn the rear wheels 2L and 2R at an angle calculated by the computer.

At the point 246 in the program, the central processing unit 51 produces a command to the cutoff valve control circuit 58. The cutoff valve control circuit 58 sets the cutoff valve 25 by producing a drive signal IF to cause the cutoff valve 25 to open. Following this, the program proceeds to the point 256 where the computer program is returned to the entry point 232.

If the answer to the question inputted at the point 234 is "yes", then it means that a failure occurs in the steering control system and the program proceeds to the point 248 where a command is produced to the cutoff valve control circuit 58. The cutoff valve control circuit 58 then stops the application of the drive signal IF to close the cutoff valve 20. At the point 250 in the program, the central processing unit 51 produces a command to the alarm lamp drive circuit 59. The alarm lamp drive circuit 58 then activates the alarm lamp 45 to provide a visible reminder to the operator that a failure occurs in the steering control system.

At the point 252 in the program, a determination is made as to whether or not the time $\Delta$T that has elapsed after the fail-safe signal is produced exceeds a predetermined value $\Delta$To (for example, 150 msec). If the answer to this question is "yes", then the program proceeds to the point 254. Otherwise, the program returns to the point 252. At the point 254, the central processing unit 51 produces a command causing the control valve control circuit 57 to stop the application of the drive signal IL* or IR* applied to the control valve 30. Following this, the program proceeds to the point 256.

During the fail-safe control, the cutoff valve 25 closes to interrupt communication between the control valve 30 and the hydraulic actuator 20 when a failure occurs in the steering control system. After the cutoff valve 25 closes, the hydraulic actuator 20 utilizes the leakage of the hydraulic pressure through the cutoff valve 25 to gradually return the rear wheels 2L and 2R to their neutral positions. This is effective to avoid a sudden change in the driving performance of the automotive vehicle.

Figure 10:
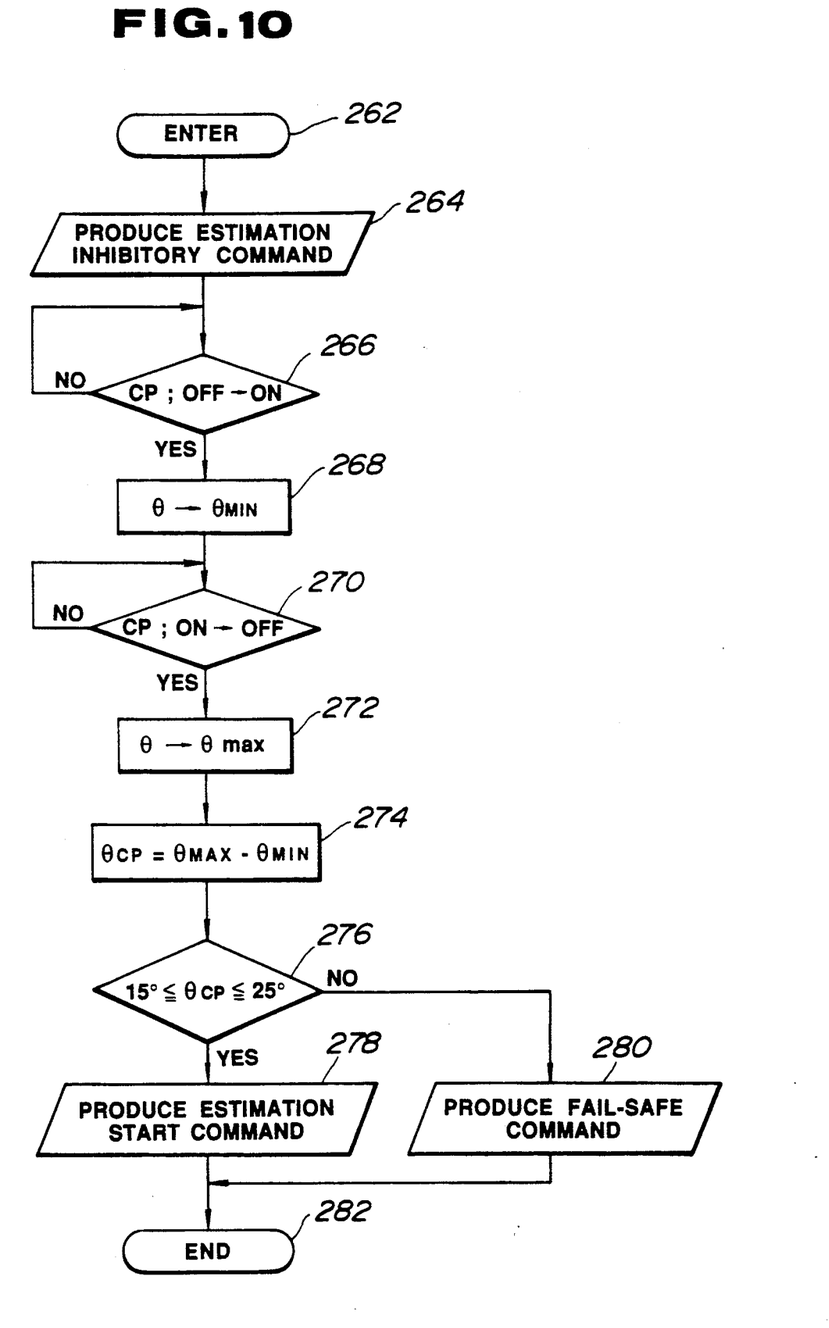
FIG. 10 is a flow diagram showing the programming of the digital computer as it is used to check a failure in the steering wheel neutral position sensor.

FIG. 10 is a flow diagram illustrating the programming of the digital computer as it is used to check a failure in the steering wheel neutral position sensor 64. The computer program is entered at the point 262 when the ignition switch 68 is turned on. At the point 264 in the program, the central processing unit 51 produces an estimation inhibitory command to inhibit the steering wheel neutral position estimation of the control unit 50. At the point 266 in the program, a determination is made as to whether or not the steering wheel neutral position signal CP, which is applied from the sensor 41, changes to its high level. If the answer to this question is "yes", then the program proceeds to the point 268. Otherwise, the program returns to the point 266.

At the point 268 in the program, the central processing unit 51 reads a value OMIN for steering wheel position $\theta$ when the steering wheel neutral position signal CP changes to its high level. At the point 270 in the program, a determination is made as to whether or not the steering wheel neutral position signal CP changes to its low level. If the answer to this question is "yes", then the program proceeds to the point 272. Otherwise, the program returns to the point 270. At the point 272, the central processing unit 51 reads a value $\theta$MAX for steering wheel position $\theta$ when the steering wheel neutral position signal CP changes to its low level. At the point 274 in the program, the central processing unit 51 calculates a difference $\theta$CP of the read value $\theta$MIN from the read value $\theta$MAX. The calculated difference $\theta$CP indicates the pulse width of the steering wheel neutral position signal CP.

At the point 276 in the program, a determination is made as to whether or not the calculated difference $\theta$CP is in a predetermined acceptable range defined between a lower limit (for example, 15°) and an upper limit (for example, 25°). The lower and upper limits may be determined as the angle $\theta$w plus and minus 5°. If the answer to this question is "yes", then it means that the steering wheel neutral position sensor 64 is in order and the program proceeds to the point 278 where an estimation start command is produced. Otherwise, the program proceeds to the point 280 where a fail-safe command is produced. In the presence of the fail-safe command, the program proceeds from the point 234 to the point 248 of FIG. 9 for the fail-safe operation of the control unit 50.

Figure 11:
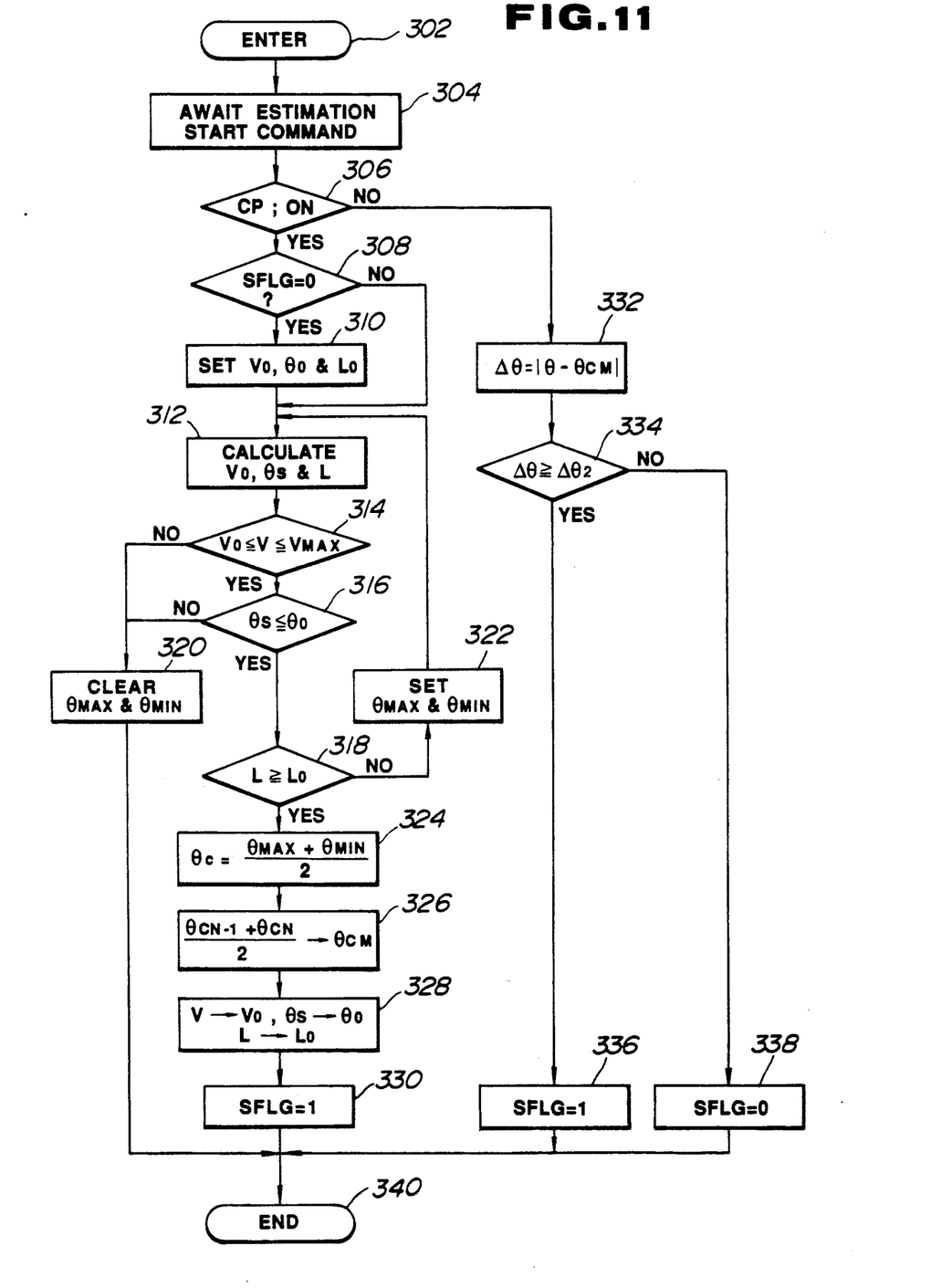
FIG. 11 is a detailed flow diagram showing the program of the digital computer as it is used to estimate a steering wheel neutral position.

FIG. 11 is a detailed flow diagram illustrating the programming of the digital computer as it is used to estimate a steering wheel neutral position value $\theta$CM. At the point 302 in FIG. 11, which corresponds to the point 212 of FIG. 7, the computer program is entered. At the point 304 in the program, the central processing unit 51 awaits the receipt of an estimation start command. The estimation start command is produced at the point 278 of FIG. 10 when the steering wheel neutral position sensor 64 is in order. After the receipt of the estimation start command, at the point 306, a determination is made as to whether or not the neutral position signal CP is at its high level. If the answer to this question is "yes", then the program proceeds to another determination step at the point 308. This determination is as to whether or not a flag SFLG is cleared. This flag SFLG is cleared to indicate that an initial steering wheel neutral position value is to be estimated and is set to indicate that the last steering wheel neutral position value is updated. If the answer to this question is "yes", then the program proceeds to the point 310 where the central processing unit 51 sets a vehicle speed reference value Vo at its initial value, the smallest possible value, (for example 20 km/h), a steering wheel position change reference value $\theta$o at its initial value, the greatest possible value, (for example 10°) and a continuous vehicle traveling distance reference value Lo at its initial value, the smallest possible value, (for example, 12.5 m). These reference values Vo, $\theta$o and Lo are used to determine conditions which should be fulfilled to estimate a steering wheel neutral position. At the point 312 in the program, the central processing unit reads the existing vehicle speed value V, the steering wheel position change value $\theta$s and the existing vehicle continuous traveling distance value L. These values V, $\theta$s and L are calculated during the execution of a separate program. If the answer to the question inputted at the point 308 is "no", then the program jumps the point 310 to the point 312.

At the point 314 in the program, a determination is made as to whether or not the read vehicle speed value V is equal to or greater than the reference value Vo and equal to or less than a predetermined maximum value VMAX (for example, 80 km/h). If the answer to this question is "yes", then the program proceeds to the point 316. Otherwise, the program proceeds to the point 320 where the maximum and minimum values $\theta$MAX and $\theta$MIN are cleared and then to the end point 340. Thus, the central processing unit 51 does not estimate the steering wheel neutral position at low vehicle speeds less than the reference value Vo (for example, 20 km/h). This is effective to prevent the central processing unit 51 from calculating the steering wheel neutral position based on an incorrect neutral position signal which may be produced from the steering wheel neutral position sensor 64 when the vehicle turns at a low speed in a circle of small radius with the steering wheel 10 being rotated at 360°. In addition, the central processing unit 51 does not estimate the steering wheel neutral position at high vehicle speeds greater than the maximum value VMAX (for example, 80 km/h). This is effective to prevent the central processing unit 51 from calculating the steering wheel neutral position based on an incorrect neutral position signal which may be produced from the steering wheel neutral position sensor 64 when the vehicle turns in a circle of great radius at a high speed creating a great tire slip angle with the steering wheel 10 being rotated at a small angle.

At the point 316 in the program, a determination is made as to whether or not the steering wheel position change value $\theta$s is equal to or less than the reference value $\theta$o. If the answer to this question is "yes", then the program proceeds to the point 318. Otherwise, the program proceeds to the point 320. At the point 318 in the program, a determination is made as to whether or not the continuous traveling distance L is equal to or greater than the reference value Lo. If the answer to this question is "yes", then the program proceeds to the point 324. Otherwise, the program proceeds to the point 322 where the maximum and minimum values $\theta$MAX and $\theta$MIN are set.

At the point 324 in the program, the central processing unit 51 calculates an average value $\theta$C of the maximum and minimum values $\theta$MAX and $\theta$MIN. The calculated average value $\theta$C is stored in the nonvolatile memory 54. At the point 326 in the program, the central processing unit 51 estimates a value $\theta$CM for steering wheel neutral position by calculating an average value of the new value $\theta$C(n) calculated at the point 324 and the last value $\theta$C(n−1) stored at the point 324 during the last cycle of execution of this program. The estimated steering wheel neutral position value $\theta$CM is stored to update the last estimated steering wheel neutral position value in nonvolatile memory 54.

At the point 328 in the program, the values V, $\theta$s and L calculated at the point 312 are stored to update the respective reference values Vo, $\theta$o and Lo for use at the point 312 during the next cycle of execution of this program. At the point 330 in the program, the flag SFLG is set. Following this the program proceeds to the end point 340 which corresponds to the point 214 of FIG. 7.

It will be understood that the point 310 where the reference values are initialized is jumped as long as the flag SFLG is set. Consequently, the conditions which should be fulfilled to estimate a steering wheel neutral position become more severe each time a new steering wheel neutral position is estimated.

If the answer to the question inputted at the point 306 is "no", then the program proceeds to the point 332 where the central processing unit 51 calculates a steering wheel position difference $\Delta\theta$ which is represented by the absolute value of the difference of the estimated steering wheel neutral position $\theta$CM from the steering wheel position $\theta$. For this purpose, the central processing unit 51 reads the existing steering wheel position value $\theta$ and reads the estimated steering neutral position value $\theta$CM from the nonvolatile memory 54. The calculated steering wheel position difference $\Delta\theta$ corresponds to the front wheel steering angle $\theta$F. At the point 334 in the program, a determination is made as to whether or not the calculated steering wheel position difference $\Delta\theta$ is equal to or greater than a predetermined value $\theta$2 (for example, 2°). If the answer to this question is "yes", then the estimated steering wheel neutral position value $\theta$CM is considered to be correct and the program proceeds to the point 336 where the flag SFLG is set and then to the end point 340. If the calculated steering wheel position difference $\Delta\theta$ is less than the predetermined value $\theta$2, then the estimated steering wheel neutral position value $\theta$CM is considered to be erroneous since the calculated difference $\Delta\theta$ is small in spite of the fact that the steering wheel position is out of the neutral position range and the program proceeds to the point 338 where the flag SFLG is cleared and then to the end point 340.

It will be understood that when the estimated steering wheel neutral position value $\theta$CM is considered to be erroneous, the reference values Vo, $\theta$o and Lo are set at the respective initial values which provide easiest conditions determined at the points 314, 316 and 318. This is effective to reduce the time required for the central processing unit 51 to estimate the steering wheel neutral position and to return the steering wheel neutral position to a correct value in a short time.

As described previously, a check is made as to whether the steering wheel neutral position sensor 64 is in order before the steering wheel neutral position is estimated. It is, therefore, possible to prevent the estimated steering wheel neutral position from deviating to a great extent from a correct steering wheel neutral position because of a failure in the steering wheel neutral position sensor or the circuit associated therewith.

Although the invention has been described in connection with a four wheeled vehicle, it is to be understood that the invention is also applicable to other wheeled vehicles including motor cycles.

Although the invention has been described in detail with reference to a preferred embodiment thereof, it should be understood that variations and modifications can be effected within the scope of the invention.

What is claimed is:

1. A steering handle neutral position estimating apparatus for use with a motor vehicle having a steering handle operable to provide a driver's vehicle steering demand, the apparatus comprising:

first sensor means sensitive to steering handle position for producing an electric signal indicative of a sensed steering wheel position;

second sensor means for sensing said steering handle position for producing a steering handle neutral position signal having a first level when the sensed steering handle position is in a predetermined range and a second level when the sensed steering handle position is out of the predetermined range; and an estimating unit coupled to the first and second sensor means, the estimating unit including means for sensing a steering handle position change;

means for sensing a vehicle continuous traveling distance;

means for sensing a vehicle traveling speed;

means for producing an estimation command signal when the sensed steering handle position change is less than a steering handle position change reference value, when the sensed continuous traveling distance is greater than a continuous traveling distance reference value and when the sensed traveling speed is greater than a first traveling speed reference value and less than a second greater traveling speed reference value, the first traveling speed reference value having a smallest possible initial value, the steering handle position change reference value having a greatest possible initial value, the continuous traveling distance reference value having a smallest possible initial value;

means responsive to the estimation command signal for estimating a steering handle neutral position value when the steering handle neutral position signal is at its first level;

means for calculating an absolute value of a difference between the estimated steering handle neutral position value and the steering handle position value sensed when the steering handle neutral position signal is at its second level;

means for producing an error signal based on the difference between the calculated absolute value and a predetermined value;

means for replacing the first traveling speed reference value with a sensed traveling speed value for which the estimation command signal is produced;

means for replacing the steering handle position change reference value with a sensed steering handle position change value for which the estimation command signal is produced;

means for replacing the continuous traveling distance reference value with a sensed continuous traveling distance value for which the estimating command signal is produced; and means responsive to the error signal for returning the first traveling speed reference value to its initial value, the steering handle position change reference value to its initial value, and the continuous traveling distance reference value to its initial value.

* * * * *